US008042768B2

(12) United States Patent
Liguore et al.

(10) Patent No.: US 8,042,768 B2
(45) Date of Patent: Oct. 25, 2011

(54) SYSTEMS AND METHODS FOR REDUCING NOISE IN AIRCRAFT FUSELAGES AND OTHER STRUCTURES

(75) Inventors: Salvatore L. Liguore, St. Louis, MO (US); Joshua M. Montgomery, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/851,431

(22) Filed: Aug. 5, 2010

(65) Prior Publication Data

US 2010/0320319 A1  Dec. 23, 2010

Related U.S. Application Data

(62) Division of application No. 11/084,779, filed on Mar. 18, 2005, now Pat. No. 7,837,147.

(51) Int. Cl.
B64C 1/40 (2006.01)

(52) U.S. Cl. ............... 244/119; 244/118.5; 181/208; 181/294

(58) Field of Classification Search .......... 244/118.5, 244/119, 121; 52/144, 145; 181/284, 288, 181/291, 292, 294, 207, 208
See application file for complete search history.

(56) References Cited

U.S. PATENT DOCUMENTS

| | | | | |
|---|---|---|---|---|
| 3,020,986 A | * | 2/1962 | Kirk et al. | 52/793.1 |
| 3,078,969 A | * | 2/1963 | Campbell et al. | 52/403.1 |
| 3,078,971 A | * | 2/1963 | Wallerstein, Jr | 52/403.1 |
| 3,088,561 A | * | 5/1963 | Ruzicka | 52/841 |
| 3,159,249 A | * | 12/1964 | Lazan | 188/268 |
| 3,832,955 A | * | 9/1974 | Pottinger et al. | 108/57.27 |
| 4,317,503 A | | 3/1982 | Soderquist et al. | |
| 4,416,349 A | | 11/1983 | Jacobs | |
| 4,425,980 A | | 1/1984 | Miles | |
| 4,428,454 A | | 1/1984 | Capaul et al. | |
| 4,522,165 A | * | 6/1985 | Ogawa | 123/195 C |
| 4,553,631 A | | 11/1985 | Panza | |
| 4,611,687 A | | 9/1986 | Nixon | |
| 4,635,882 A | | 1/1987 | SenGupta et al. | |
| 4,678,707 A | | 7/1987 | Shinozaki et al. | |
| 4,786,343 A | * | 11/1988 | Hertzberg | 156/93 |

(Continued)

OTHER PUBLICATIONS

Aircraft Damping Composites, Product Bulletin ADC, date unknown, 4 pgs.

(Continued)

*Primary Examiner* — Benjamin P Lee
(74) *Attorney, Agent, or Firm* — Perkins Coie LLP

(57) ABSTRACT

Systems and methods for reducing noise in aircraft fuselages and other structures are described herein. A noise reduction system configured in accordance with one embodiment of the invention includes an auxetic core, a damping layer, and a constraining layer. In this embodiment, the auxetic core is supported by a structural member, and the damping layer is sandwiched between the auxetic core and the constraining layer. A method for manufacturing a structural assembly in accordance with another embodiment of the invention includes forming a stiffener by positioning a first ply of composite material against a first tool surface, positioning damping material against the first ply, and positioning a second ply of composite material against the damping material to sandwich the damping material between the first and second plies. The method can further include forming a skin by positioning a third ply of composite material against a second tool surface offset from the first tool surface, and attaching the stiffener to the skin by co-curing the first, second and third plies of composite material.

15 Claims, 8 Drawing Sheets

U.S. PATENT DOCUMENTS

| | | | |
|---|---|---|---|
| 4,828,202 A | 5/1989 | Jacobs et al. | |
| 4,931,340 A * | 6/1990 | Baba et al. | 428/73 |
| 4,966,802 A * | 10/1990 | Hertzberg | 428/119 |
| 5,024,399 A * | 6/1991 | Barquet et al. | 244/119 |
| 5,063,098 A * | 11/1991 | Niwa et al. | 428/76 |
| 5,087,491 A | 2/1992 | Barrett | |
| 5,106,668 A * | 4/1992 | Turner et al. | 428/116 |
| 5,151,311 A | 9/1992 | Parente et al. | |
| 5,165,627 A * | 11/1992 | Amano et al. | 244/119 |
| 5,232,073 A * | 8/1993 | Bronowicki et al. | 188/378 |
| 5,256,223 A | 10/1993 | Alberts et al. | |
| 5,277,958 A * | 1/1994 | Tomkins | 428/116 |
| 5,308,675 A * | 5/1994 | Crane et al. | 428/120 |
| 5,368,914 A * | 11/1994 | Barrett | 428/201 |
| 5,445,861 A | 8/1995 | Newton et al. | |
| 5,507,477 A | 4/1996 | Manning et al. | |
| 5,527,414 A * | 6/1996 | Dublinski et al. | 156/245 |
| 5,604,010 A * | 2/1997 | Hartz et al. | 428/118 |
| 5,667,866 A * | 9/1997 | Reese, Jr. | 428/116 |
| 5,710,396 A | 1/1998 | Rogers | |
| 5,744,221 A | 4/1998 | Crane et al. | |
| 5,851,336 A * | 12/1998 | Cundiff et al. | 156/272.2 |
| 5,866,272 A | 2/1999 | Westre et al. | |
| 5,904,318 A | 5/1999 | Towfiq | |
| 5,916,954 A | 6/1999 | Bohn et al. | |
| 5,958,556 A * | 9/1999 | McCutcheon | 428/172 |
| 6,065,717 A * | 5/2000 | Boock | 244/1 N |
| 6,110,985 A | 8/2000 | Wheeler | |
| 6,117,518 A | 9/2000 | Cawse et al. | |
| 6,179,086 B1 * | 1/2001 | Bansemir et al. | 181/292 |
| 6,497,190 B1 * | 12/2002 | Lewit | 114/357 |
| 6,510,961 B1 * | 1/2003 | Head et al. | 220/645 |
| 6,632,502 B1 * | 10/2003 | Allen et al. | 428/119 |
| 6,755,998 B1 * | 6/2004 | Reichard et al. | 264/46.5 |
| 6,764,754 B1 * | 7/2004 | Hunter et al. | 428/301.4 |
| 6,878,320 B1 | 4/2005 | Alderson et al. | |
| 7,040,575 B2 | 5/2006 | Struve et al. | |
| 7,074,474 B2 * | 7/2006 | Toi et al. | 428/102 |
| 7,083,147 B2 | 8/2006 | Movsesian et al. | |
| 7,134,629 B2 | 11/2006 | Johnson et al. | |
| D533,950 S * | 12/2006 | Givoni | D25/138 |
| 7,160,621 B2 | 1/2007 | Chaudhari et al. | |
| 7,181,891 B2 | 2/2007 | Surace et al. | |
| 7,197,852 B2 * | 4/2007 | Grillos | 52/144 |
| 7,291,373 B2 * | 11/2007 | Bartley-Cho et al. | 428/61 |
| 7,325,771 B2 | 2/2008 | Stulc et al. | |
| 7,364,221 B2 * | 4/2008 | Tahri et al. | 296/187.02 |
| 7,419,031 B2 * | 9/2008 | Liguore et al. | 181/210 |
| 7,419,627 B2 * | 9/2008 | Sheu et al. | 264/257 |
| 7,503,368 B2 | 3/2009 | Chapman et al. | |
| 7,798,285 B2 * | 9/2010 | Chiou et al. | 181/213 |
| 2002/0178992 A1 * | 12/2002 | Lewit | 114/357 |
| 2003/0066708 A1 | 4/2003 | Allison et al. | |
| 2003/0168555 A1 | 9/2003 | Livi et al. | |
| 2005/0211838 A1 | 9/2005 | Struve et al. | |
| 2006/0145006 A1 | 7/2006 | Drost | |
| 2006/0208135 A1 | 9/2006 | Liguore | |
| 2007/0094950 A1 | 5/2007 | Surace et al. | |
| 2007/0095982 A1 * | 5/2007 | Kismarton et al. | 244/119 |
| 2008/0029644 A1 * | 2/2008 | Martinez Cerezo et al. | 244/119 |
| 2008/0035788 A1 | 2/2008 | Kothera et al. | |
| 2008/0230652 A1 | 9/2008 | Biornstad et al. | |
| 2009/0026315 A1 * | 1/2009 | Edelmann et al. | 244/119 |
| 2010/0133380 A1 | 6/2010 | Roebroeks et al. | 244/119 |
| 2010/0282904 A1 * | 11/2010 | Kismarton et al. | 244/119 |

OTHER PUBLICATIONS

Biggerstaff et al., "Shear Measurements of Vicoelastic Damping Materials Embedded in Composite Plates," Materials Science Program, University of California San Diego, 11 pages.

Damping Technologies, Inc., "Stand-Off Damping Systems," 3 pages.

Definition of "Strip," http://dictionary.references.com/browse/strip, accessed Jun. 21, 2009, 2 pages.

Roush, Damped Viscoelastic Acrylic Adhesive—RA980—From Start to Finish, 2004, 2 pages.

* cited by examiner

SYSTEMS AND METHODS FOR REDUCING NOISE IN AIRCRAFT FUSELAGES AND OTHER STRUCTURES

CROSS-REFERENCE TO RELATED APPLICATION

This is a divisional application of U.S. patent application Ser. No. 11/084,779, filed Mar. 18, 2005, entitled "SYSTEMS AND METHODS FOR REDUCING NOISE IN AIRCRAFT FUSELAGES AND OTHER STRUCTURES," and incorporated herein in its entirety by reference.

TECHNICAL FIELD

The following disclosure relates generally to acoustic damping systems and, more particularly, to acoustic damping systems for use in aircraft fuselages and other structures.

BACKGROUND

Wing-mounted engines on commercial aircraft can generate "shock-cell" noise that excites low frequency vibrational modes in the fuselage. The vibrational energy is transmitted through the fuselage by stiffeners and frames, and can cause substantial noise in the passenger cabin. This noise is often difficult to dampen, and is typically addressed by bonding relatively thick, metallic layers to portions of the stiffeners and/or frames to provide what is commonly referred to as constrained layer damping.

FIGS. 1A and 1B are end views of two constrained layer damping systems 110a and 110b, respectively, configured in accordance with the prior art. Referring first to FIG. 1A, the damping system 110a is attached to a longitudinal stiffener 102a which in turn is attached to a fuselage skin 108a. The damping system 110a includes a constraining layer 104a which is bonded to the stiffener 102a by an adhesive layer 106a. The constraining layer 104a is typically aluminum, and the adhesive layer 106a is typically a viscoelastic adhesive, such as one of the Scotch Damp Viscoelastic Adhesives products provided by the 3M™ Company under the ISD-112, ISD-113, or ISD-830 part numbers. Referring next to FIG. 1B, the prior art damping system 110b includes an angled constraining layer 104b attached to a stiffener 102b by means of an adhesive layer 106b. With the exception of the angle, the constraining layer 104b and the adhesive layer 106b can be similar in structure and function to their counterparts in FIG. 1A.

One downside of the prior art damping systems described above with reference to FIGS. 1A and 1B is that they can add significant weight to the base structure. For example, a typical installation of the configuration illustrated in FIG. 1A can weigh up to 0.9 pound per square foot of damping system. Another downside of these damping systems is that they can be difficult to manufacture and install.

SUMMARY

This summary is provided for the benefit of the reader only, and is not intended to limit the invention as set forth by the claims. The present invention is directed generally toward systems and methods for reducing noise in aircraft fuselages and other structures. A noise reduction system configured in accordance with one aspect of the invention includes an auxetic core supported by a structural member. The auxetic core can have a first surface facing at least approximately toward the structural member and a second surface facing at least approximately away from the structural member. The noise reduction system can further include a damping layer sandwiched between the second surface of the auxetic core and a constraining layer. In one embodiment, the auxetic core can include a material that expands in a first direction when stretched in a second direction perpendicular to the first direction. In another embodiment, the damping layer can include a viscoelastic adhesive.

A method of manufacturing a structural assembly in accordance with another aspect of the invention includes attaching a stiffener to a skin and attaching an auxetic core to a portion of the stiffener. The method can further include covering at least a portion of the auxetic core with a damping layer, and sandwiching the damping layer between the auxetic core and a constraining layer. In one embodiment of this method, attaching a stiffener to a skin can include bonding a fiber-reinforced resin stiffener to a fiber-reinforced resin skin during a co-curing process.

A structural assembly configured in accordance with yet another aspect of the invention can include a stiffener having a first stiffener portion configured to be attached to a skin panel, and a second stiffener portion configured to be offset from the skin panel. The second stiffener portion can include at least first and second plies of fiber-reinforced resin material, and the structural assembly can further include a layer of damping material sandwiched between the first and second plies of fiber-reinforced resin material. In one embodiment of this structural assembly, the layer of damping material can include a viscoelastic damping material. In another embodiment, both the stiffener and the skin panel can be composed of fiber-reinforced resin material.

DETAILED DESCRIPTION

The following disclosure describes various systems and methods for reducing noise in aircraft fuselages and other structures. Certain details are set forth in the following description to provide a thorough understanding of various embodiments of the invention. Other details describing well-known structures and methods often associated with structural damping systems and composite manufacturing are not set forth below, however, to avoid unnecessarily obscuring the description of the various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any referenced number refer to the Figure in which that element is first introduced. For example, element 210 is first introduced and discussed with reference to FIG. 2.

Figure 1A:
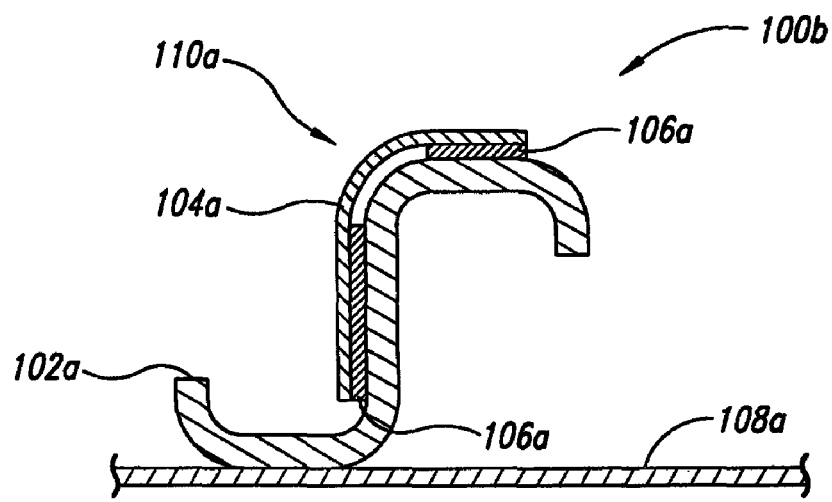
FIGS. 1A and 1B are end views of stiffeners having constrained layer damping systems configured in accordance with the prior art.
Figure 1B:
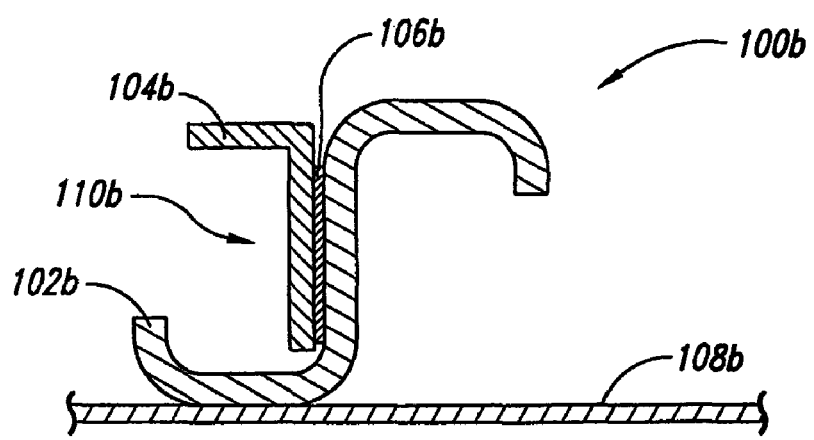
Figure 2:
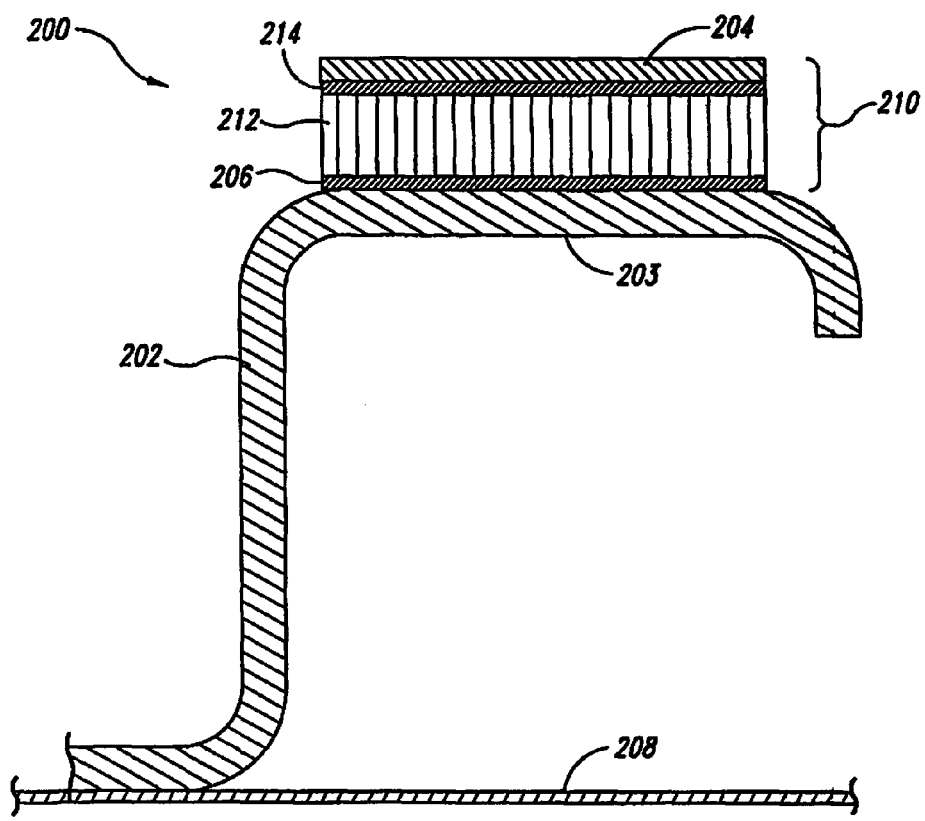
FIG. 2 is an end view of a stiffener with a constrained layer damping system configured in accordance with an embodiment of the invention.

FIG. 2 is an end view of a structural assembly 200 that includes a constrained layer damping system 210 ("damping system 210") configured in accordance with an embodiment of the invention. In the illustrated embodiment, the damping system 210 is attached to a cap portion 203 of a longitudinal "Z"-section stiffener 202 ("stiffener 202"), and the stiffener 202 is attached to a skin 208. The damping system 210 can include a viscoelastic damping layer 214 sandwiched between an auxetic core 212 and a constraining layer 204. The constraining layer 204 can include a number of different materials including both metallic materials (e.g., aluminum, steel, titanium, etc.) and non-metallic materials (e.g., fiber-reinforced resin materials or "composite materials" as they are commonly known). For stiffness and/or weight considerations, composite materials (e.g., graphite/epoxy materials) may be desirable. For example, in one embodiment, the constraining layer 204 can include multiple plies of graphite/epoxy material having a total thickness of about 0.006 inch to about 0.05 inch (e.g., about 0.01 inch). In another embodiment, the constraining layer 204 can include three plies of graphite/epoxy material oriented on a 0/90/0 bias. In other embodiments, the constraining layer 204 can include other materials having other thicknesses. For example, in one other embodiment, the constraining layer 204 can include aluminum sheet material.

The damping layer 214 can include can include a viscoelastic pressure sensitive adhesive (PSA) having a thickness of about 0.005 to about 0.02 inch (e.g., about 0.01 inch). As those of ordinary skill in the art are aware, the term "viscoelastic" is often used to describe a material that demonstrates both viscous and elastic properties. Suitable PSAs can include acrylic, urethane, silicon, or epoxy-based adhesives. In this regard, the 3M™ Company provides a number of suitable viscoelastic adhesives having part numbers ISD-112, ISD-113, and ISD-830. In other embodiments, other viscoelastic materials can be used to attach the constraining layer 204 to the auxetic core 212. Such viscoelastic materials can include, for example, viscoelastic foam materials (e.g., viscoelastic closed- and opened-cell foam materials) having suitable adhesive properties.

As described in greater detail below, in one embodiment of the invention the auxetic core 212 has a negative Poisson's ratio. That is, in contrast to most elastic materials, the auxetic core 212 expands in a first direction when stretched in a second direction perpendicular to the first direction. Suitable auxetic core materials can include Nomex® auxetic honeycomb core provided by the M.C. Gill Corporation of 4056 Easy Street, El Monte, Calif. 91731. Other suitable core materials can include other commercially available honeycomb materials and foam materials. In the illustrated embodiment, the auxetic core 212 can have a thickness ranging from about 0.03 inch to about 0.15 inch (e.g., about 0.125 inch). In other embodiments, the auxetic core 212 can have other thicknesses depending on a number of different factors including, for example, core density, Poisson's ratio, the level of damping desired, etc.

The auxetic core 212 is attached to the stiffener 202 by an adhesive layer 206. The adhesive layer 206 can include a PSA that is at least generally similar in structure and function to the adhesive used for the damping layer 214. As mentioned above, suitable PSAs can include acrylic, urethane, silicon, and epoxy-based adhesives. In the illustrated embodiment, the adhesive layer 206 can have a thickness ranging from about 0.003 to about 0.01 inch. In other embodiments, the adhesive layer 206 can have other thicknesses and can include other substances for bonding the auxetic core 212 to the stiffener 202 as shown in FIG. 2.

The skin 208 and the stiffener 202 can be manufactured from a plurality of different materials including both metallic materials (e.g., aluminum, steel, titanium, etc.) and/or composite materials. Conventional composite materials typically include graphite, glass, or polyarimide fibers in a matrix of epoxy or other resin. Although described herein in the context of an aircraft fuselage, the damping system 210 is not limited to this particular use. Accordingly, in other embodiments, the damping system 210 can be used to reduce noise in other structures including, for example, other air, land, and marine vehicles.

Figure 3:
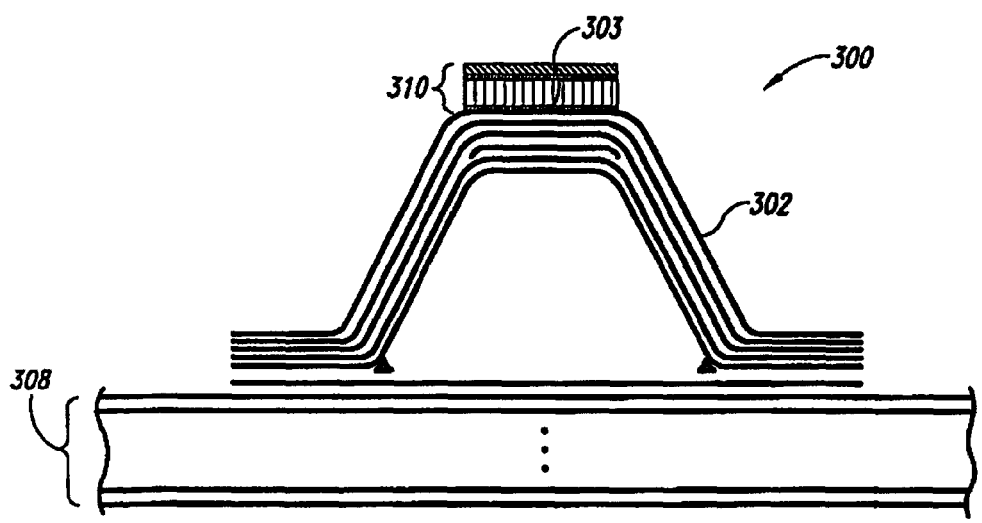
FIG. 3 is an end view of another stiffener with a constrained layer damping system configured in accordance with an embodiment of the invention.

FIG. 3 is a partially exploded end view of a structural assembly 300 having a damping system 310 that is at least generally similar in structure and function to the damping system 210 described above with reference to FIG. 2. In this embodiment, the damping system 310 is bonded to a cap portion 303 of a hat-section stiffener 302, and the hat-section stiffener 302 is attached to a skin 308. Both the hat-section stiffener 302 and the skin 308 can be manufactured from multiple plies of composite materials (e.g., graphite/epoxy materials). For example, as described in greater detail below, in one embodiment the hat-section stiffener 302 can be co-cured with the skin 308 to bond the stiffener 302 to the skin 308. In this embodiment, the damping system 310 can then be bonded to the cap portion 303 during a subsequent assembly step.

Figure 4A:
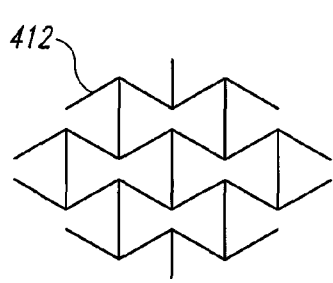
FIGS. 4A and 4B are top views of a portion of auxetic core illustrating a particular strain characteristic associated with this type of material.
Figure 4B:
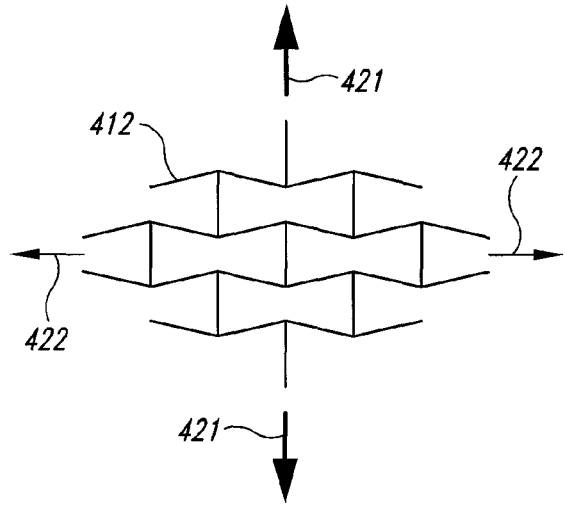

FIGS. 4A and 4B are two different top views of a portion of auxetic honeycomb core 412. In FIG. 4A, the auxetic core 412 is in a relaxed, unexpanded state. In FIG. 4B, the auxetic core has been stretched in a first direction 421. As FIG. 4B illustrates, stretching the auxetic core 412 in the first direction 421 causes it to expand in a second direction 422 perpendicular to the first direction 421. This atypical behavior is commonly characterized by a negative Poisson's ratio, because conventional materials with positive Poisson's ratios contract in the transverse direction when stretched in the longitudinal direction.

With reference to FIG. 2, the negative Poisson's ratio of the auxetic core 212 has the effect of amplifying the shear strain in the damping layer 214 during bending motion of the stiffener 202. The amplified shear strain in the damping layer 214 increases the ability of the damping system 210 to dissipate the noise energy transmitted through the stiffener 202. In this manner, the damping system 210 can effectively dissipate vibrational energy in the structural assembly 200 through exaggerated shearing motion in the damping layer 214.

Indeed, in some embodiments, the auxetic core 212 has been shown to amplify the strain energy dissipation characteristics of damping systems by as much as fifty percent.

Figure 5:
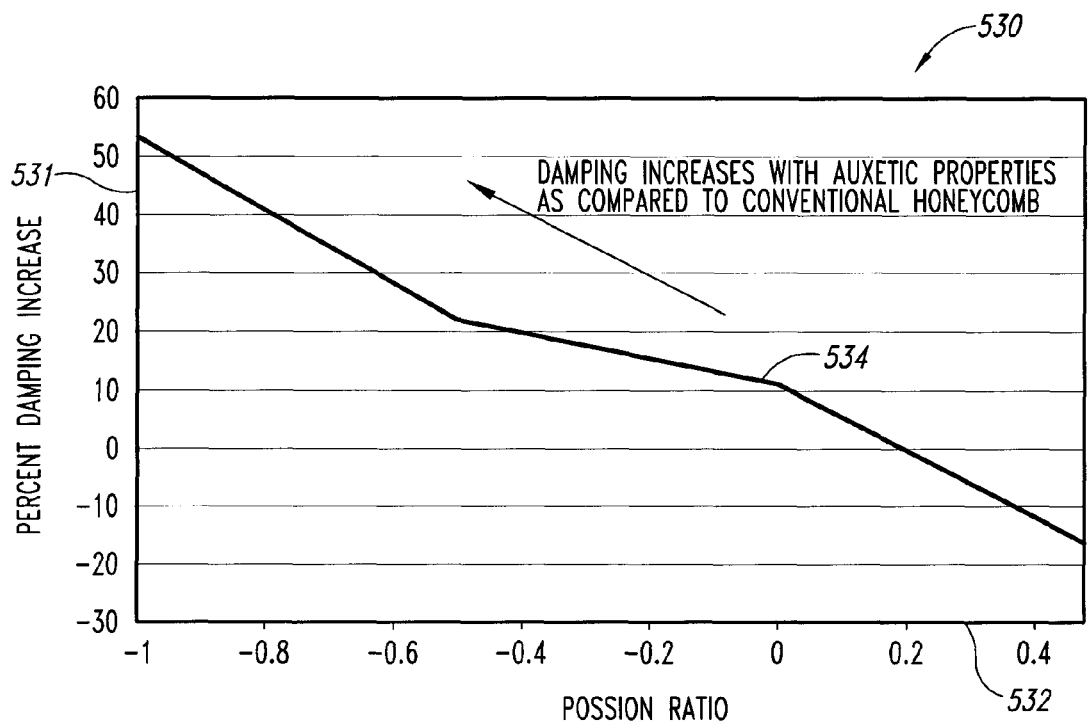
FIG. 5 is a graph illustrating the effect of Poisson's ratio on damping for a constrained layer damping system with an auxetic core.

FIG. 5 is a graph 530 illustrating the effect of Poisson's ratio on damping for damping systems that use auxetic core in accordance with embodiments of the invention. Damping percentage is measured along a vertical axis 531, and Poisson's ratio is measured along a horizontal ratio 532. As a plot 534 demonstrates, in this embodiment vibrational dampening can increase by about fifty percent when the Poisson's ratio of the auxetic core drops from about 0.2 to about −1. In a broader sense, the plot 534 reflects the fact that damping increases as Poisson's ratio becomes more negative.

Figure 6A:
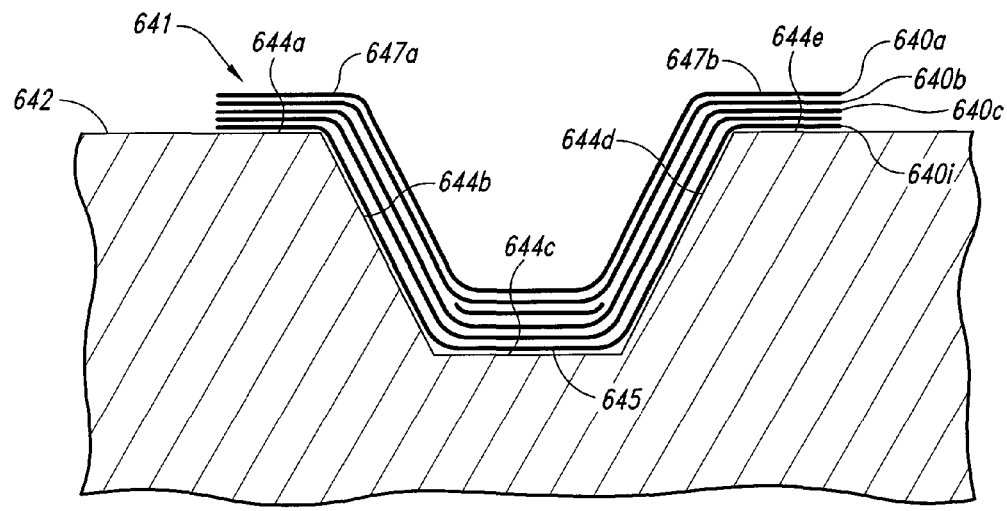
FIGS. 6A-6G are a series of cross-sectional end views illustrating various stages in a method for manufacturing structural assemblies with integrated viscoelastic damping layers in accordance with an embodiment of the invention.

FIGS. 6A-6F are a series of end views describing various aspects of a method for manufacturing a stiffened structure with an integrated viscoelastic damping layer, in accordance with an embodiment of the invention. Referring first to FIG. 6A, a plurality of uncured fiber-reinforced resin plies 640 (identified individually as plies 640a-i) are positioned on a stiffener tool 642 to form the basis of a stiffener lay-up 641. The fiber-reinforced resin plies can include a number of different fiber/resin materials, including graphite/epoxy materials. In addition, the plies can be arranged in various orientations known in the art for providing the desired structural characteristics. The stiffener tool 642 includes a plurality of tool surfaces 644 (identified individually as tool surfaces 644a-e) which give the stiffener lay-up 641 a hat-section cross-sectional shape. The hat-section cross-sectional shape includes a cap portion 645 offset from opposing base portions 647a and 647b. In other embodiments, stiffeners having other cross-sectional shapes (e.g., "I," "Z," "C," "T," "L," etc. cross-sectional shapes) can be manufactured in accordance with the methods described herein.

Figure 6B:
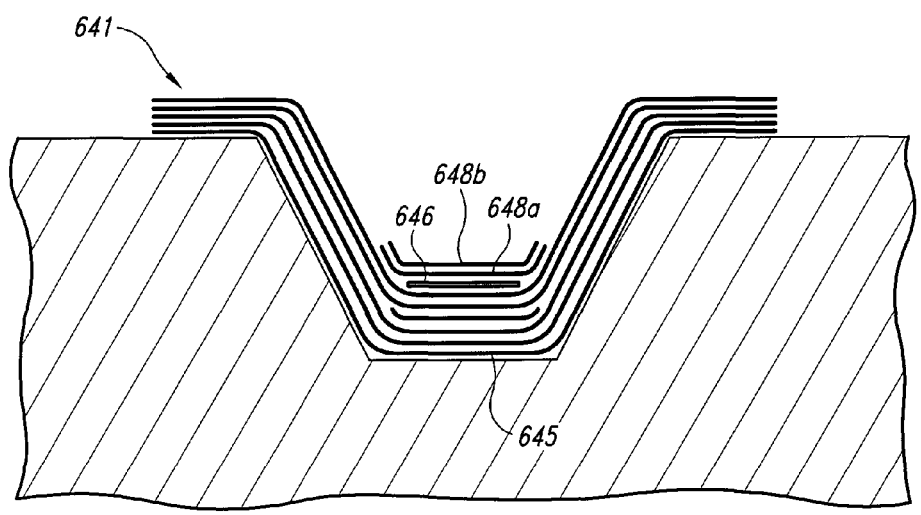

Referring next to FIG. 6B, a damping layer 646 is laid down against the cap portion 645 of the stringer lay-up 641, and one or more constraining layer plies 648 (identified individually as a first constraining layer 648a and a second constraining layer 648b) are laid over the damping layer 646. The damping layer 646 can include a thin, viscoelastic polymer material having a thickness from about 0.005 inch to about 0.02 inch (e.g., about 0.01 inch). Suitable damping materials can include, for example, acrylic, urethane, silicon, rubber, etc.

In some embodiments, the damping layer 646 may need to withstand elevated temperatures and pressures during subsequent curing processes. For example, in one embodiment, the damping layer 646 may need to withstand temperatures up to about 350° Fahrenheit and pressures of about 90 pounds per square inch (psi) for extended periods of time (e.g., up to six hours). At these temperatures and pressures, viscoelastic materials can become soft and squeeze out of the laminate. This can have a negative effect on the porosity, strength, and/or stiffness of the resulting part or assembly. In addition, some viscoelastic materials may chemically interact with the resin portion of fiber-reinforced resin materials. This interaction can alter the basic characteristics of the viscoelastic material and/or the fiber-reinforced resin materials. For example, interaction resulting in co-polymerization can reduce the damping properties of some viscoelastic materials. One method for reducing the likelihood of co-polymerization and/or viscoelastic squeeze is to add a barrier ply around the viscoelastic layer. Various types of materials are suitable for a barrier ply. One type includes a scrim, which is a thin, mesh-like material that helps to maintain the shape of the viscoelastic material during curing. Another approach involves laminating the viscoelastic layer between two plies of thin (e.g., 0.0005 inch thick), perforated material, such as polyvinyl fluoride sold under the brand name of Tedlar®.

The constraining layers 648 can include uncured fiber-reinforced resin materials (e.g., graphite/epoxy materials) that are at least generally similar in structure and function to the fiber-reinforced resin plies 640 described above with reference to FIG. 6A. In the embodiment illustrated in FIG. 6B, the edges of the constraining layers 648 extend beyond the damping layer 646 so that the constraining layers 648 can be bonded to the fiber-reinforced resin plies 640 during a subsequent curing process.

Figure 6C:
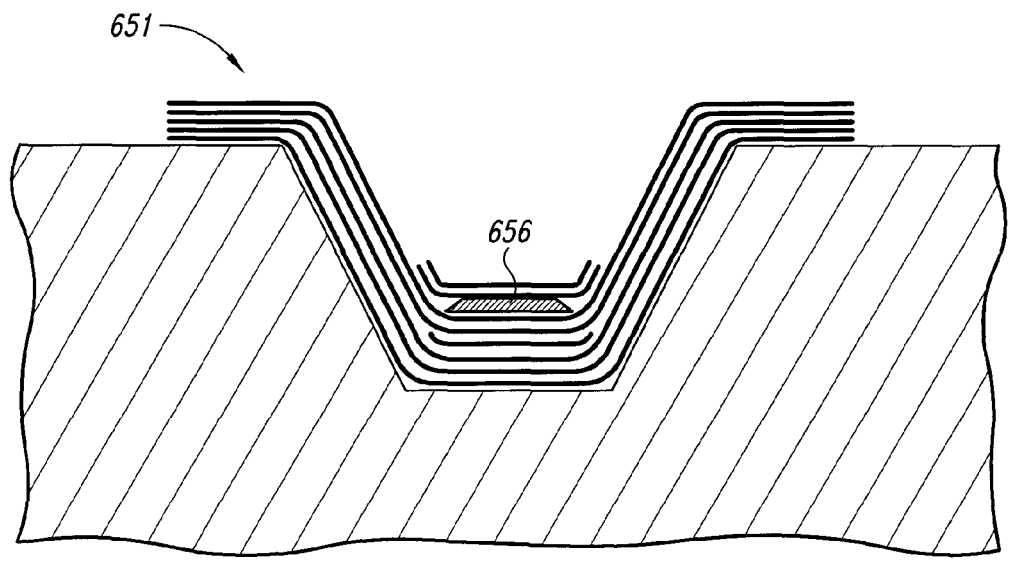
Figure 6D:
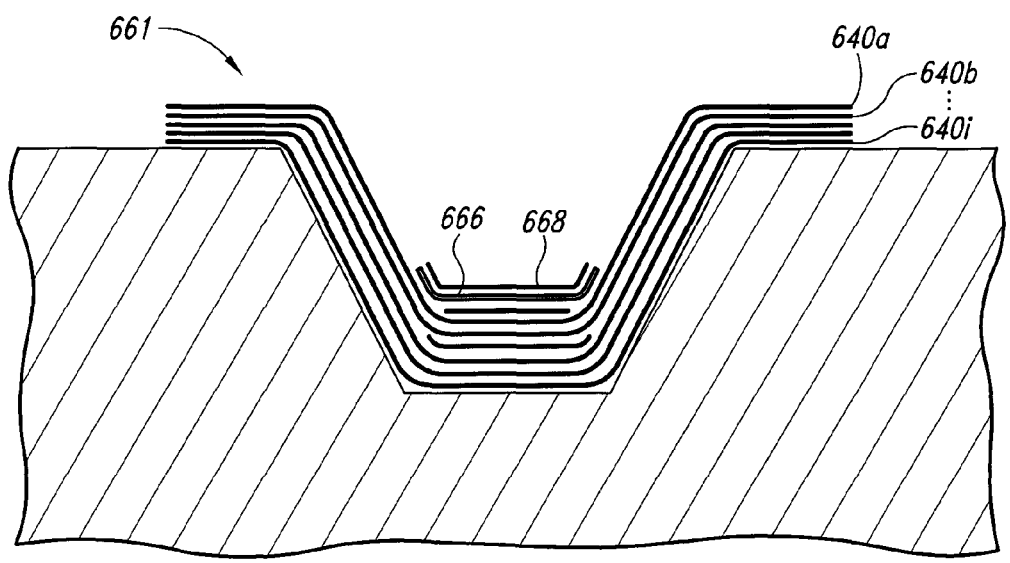

FIG. 6C illustrates another embodiment in which a stiffener lay-up 651 includes a damping layer 656 having a thickness from about 0.02 inch to about 0.06 inch (e.g., about 0.03 inch). When damping layers of this thickness are used, it may be advantageous to taper the edges of the damping layer 656 as shown in FIG. 6C to avoid creating a step and/or gaps in the lay-up. FIG. 6D illustrates a further embodiment in which a constraining layer 668 "floats" on a corresponding damping layer 666. Here, the term "float" is used to describe the condition in which the edges of the constraining layer 668 do not extend over the damping layer 666 for attachment to the fiber-reinforced resin plies 640.

Figure 6E:
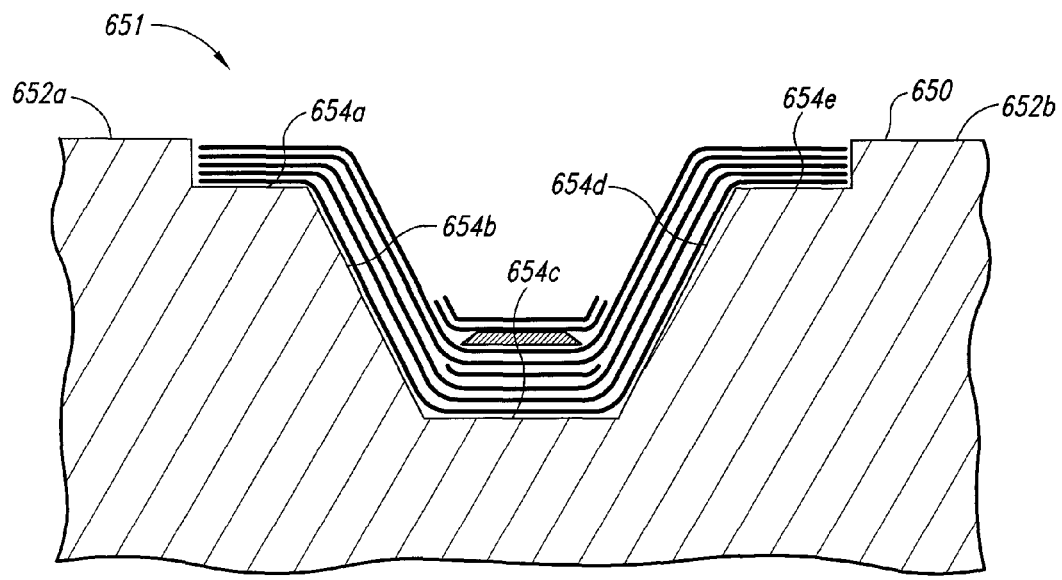

After assembling a stiffener lay-up as shown in FIG. 6B, 6C, or 6D, the stiffener lay-up (e.g., the stiffener lay-up 651) is positioned in a shell tool 650, a portion of which is illustrated in FIG. 6E. The shell tool 650 includes a plurality of stiffener tool surfaces 654 (identified individually as stiffener tool surfaces 654a-e) and a plurality of adjacent skin tool surfaces 652 (identified individually as skin tool surfaces 652a and 652b). The stiffener tool surfaces 654 are dimensionally similar to the tool surfaces 644 described above with reference to FIG. 6A, and provide support for the stiffener lay-up 651 in the desired hat-section shape.

As described in greater detail below, the skin tool surfaces 652b are configured to support one or more plies of fiber-reinforced resin material (not shown in FIG. 6E) which over-lay the stiffener lay-up 651 to form a composite hat-stiffened shell structure. The over-laying fiber-reinforced resin material can include fabric plies, tape, and/or filament wound toes. In this regard, in one embodiment, the shell lay-up tool 650 can include a stationary or rotating lay-up mandrel or similar tool for forming a one-piece composite aircraft fuselage. Various methods and systems for forming one-piece composite fuselages are described in detail in co-pending U.S. patent application Ser. Nos. 10/853,075; 10/851,381; 10/949,848; and 10/996,922; each of which is incorporated herein in its entirety by reference.

Figure 6F:
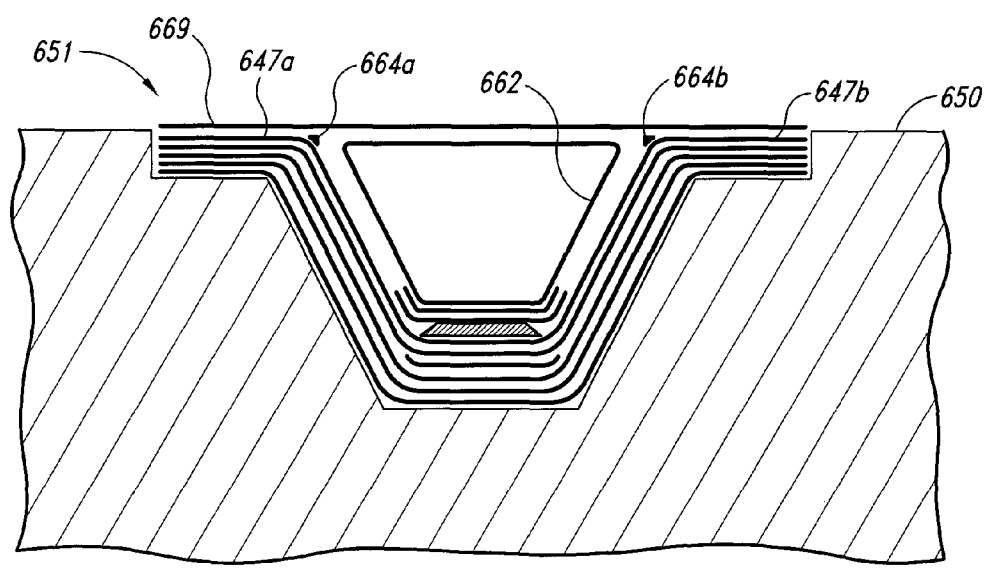

Referring next to FIG. 6F, a flexible bladder 662 is positioned inside the stiffener lay-up 651. The bladder 662 can include an elongate tubular membrane or similar material for sealing the stiffener lay-up 651 during the subsequent vacuum-bagging and curing processes. After the bladder 662 is in place, a first adhesive strip 664a is positioned along the inboard edge of the first base portion 647a, and a second adhesive strip 664b is positioned along an adjacent inboard edge of the second base portion 664b. An adhesive layer 669 is then positioned over the stiffener lay-up 651 from the extents of the first base portion 647a and the second base portion 647b.

Figure 6G:
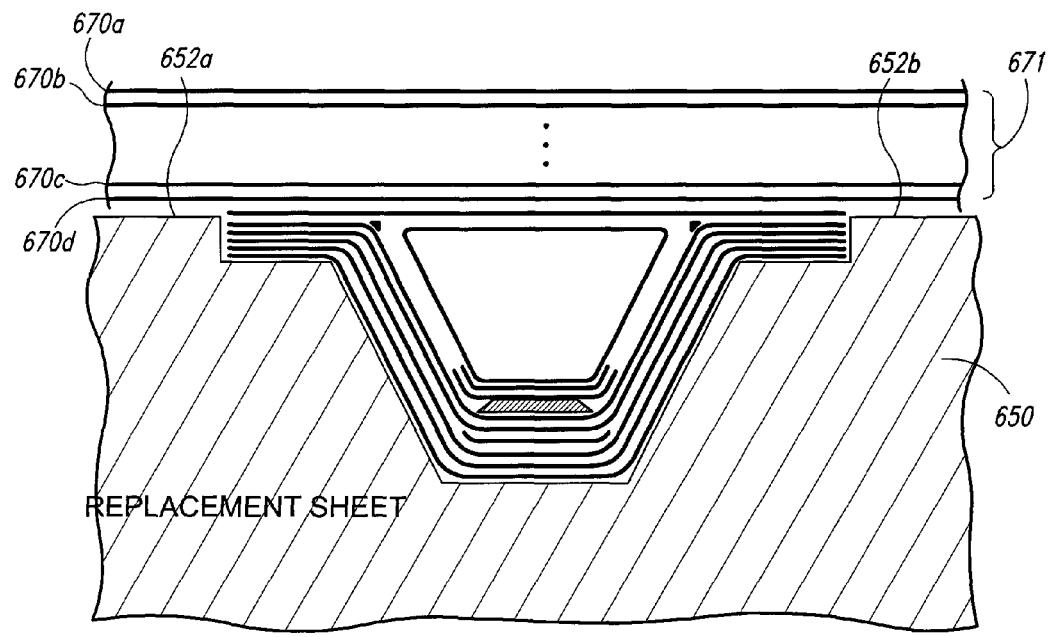

As shown in FIG. 6G, one or more fiber-reinforced resin plies 670 (identified individually as plies 670a-d) are laid-up on the shell tool 650 to form a skin lay-up 671. The skin plies 670 can include various types of known fiber-reinforced resin materials including, for example, preimpregnated bidirectional and/or unidirectional fabrics, tapes, and/or filaments, in various orientations or biases. For instance, in the illustrated embodiment, the first ply 670a and the fourth ply 670d can include a fabric (e.g., a bidirectional graphite/epoxy fabric), while the intermediate plies 670b and 670c can include tape (e.g., a unidirectional graphite/epoxy tape). Once the skin plies 670 have been applied to the tool 650, the combined skin/stiffener lay-up can be vacuum-bagged and positioned in a suitable autoclave or oven for curing at an elevated temperature and/or pressure. Alternatively, if raised temperatures and/or pressures are not required for satisfactory curing, then the lay-up can be cured at room temperature.

One feature of the manufacturing method described above with reference to FIGS. 6A-6G, is that the stiffener lay-up 641 bonds to the skin lay-up 671 during the co-curing process. One advantage of this feature is that it provides a continuous, high-strength bond that alleviates the need to fasten the stiffener to the skin with additional mechanical fasteners. Another feature of the method described above is that the damping layer (e.g., the damping layer 646 of FIG. 6B) is integrally formed with the stiffener during the manufacturing process. An advantage of this feature is that it streamlines the manufacturing process by eliminating the need to attach a separate damping system to the stiffener after the corresponding shell structure has been produced. Another advantage of laminating the damping layer into the stiffener during the manufacturing process is that it provides a relatively efficient damping mechanism without the additional weight typically associated with conventional constrained layered damping systems that utilize a metallic constrained layer.

Figure 7:
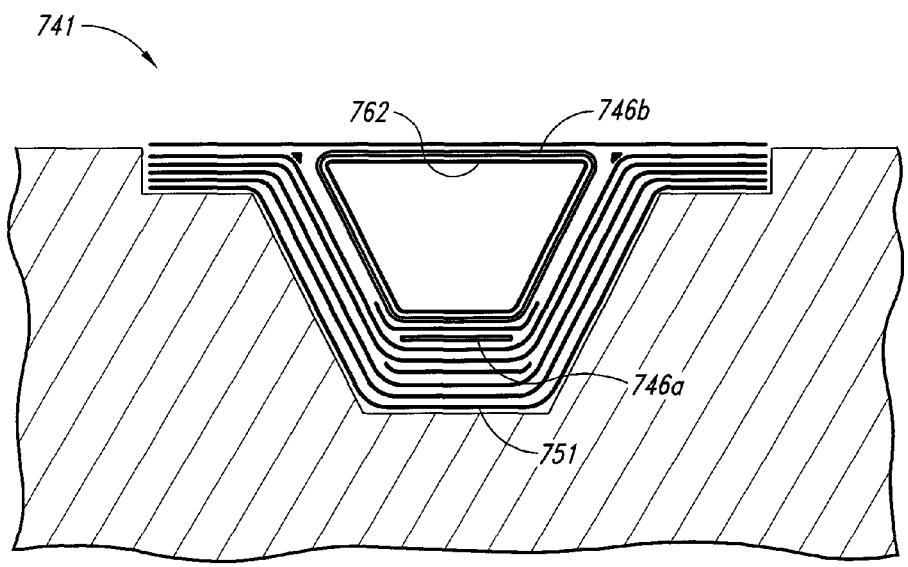
FIG. 7 is a cross-sectional end view of a stiffener lay-up with an integrated viscoelastic damping layer in accordance with another embodiment of the invention.

FIG. 7 is an end view of a stiffener lay-up 741 that is at least generally similar in structure and function to the stiffener lay-up 641 described above with reference to FIGS. 6A and 6B. For example, the stiffener lay-up 741 includes a cap portion 745a to which a first damping layer 746a is laminated. In this particular embodiment, however, a second damping layer 746b is wrapped around a bladder 762 positioned inside the stiffener lay-up 741. During a subsequent curing process, the second damping layer 746b bonds to the inner walls of the stiffener lay-up 741 and the adjacent skin lay-up (not shown). One advantage of this embodiment is that it can provide additional noise reduction with a relatively minor increase in weight.

Figure 8:
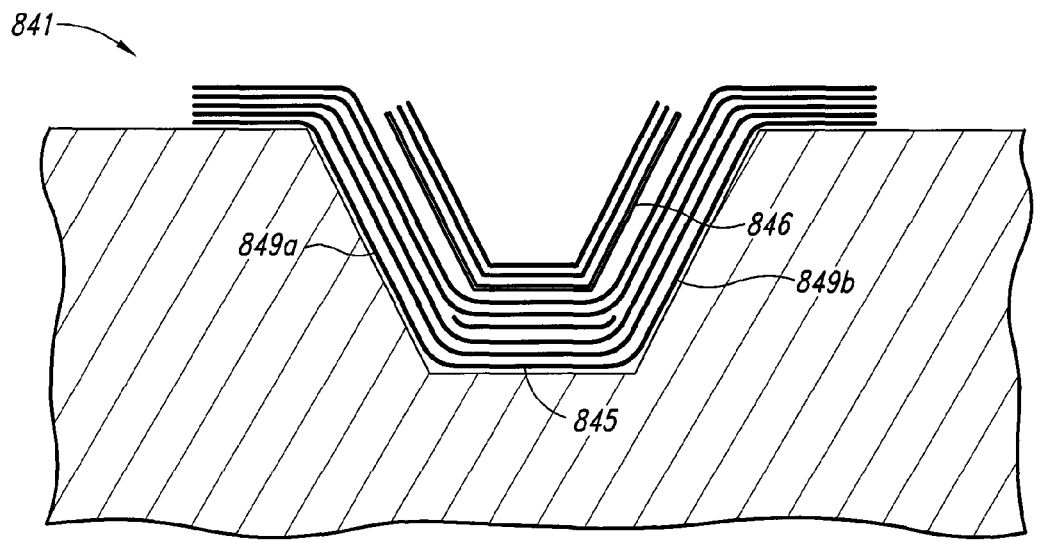
FIG. 8 is a cross-sectional end view of a structural assembly with an integrated viscoelastic damping layer in accordance with a further embodiment of the invention.

FIG. 8 is an end view of a stiffener lay-up 841 configured in accordance with another embodiment of the invention. The stiffener lay-up 841 is at least generally similar in structure and function to the stiffener lay-up 641 described above with reference FIGS. 6A and 6B. In this particular embodiment, however, a damping layer 846 extends beyond a cap portion 845 of the stiffener lay-up 841, and onto adjacent sidewall portions 849a and 849b.

Figure 9:
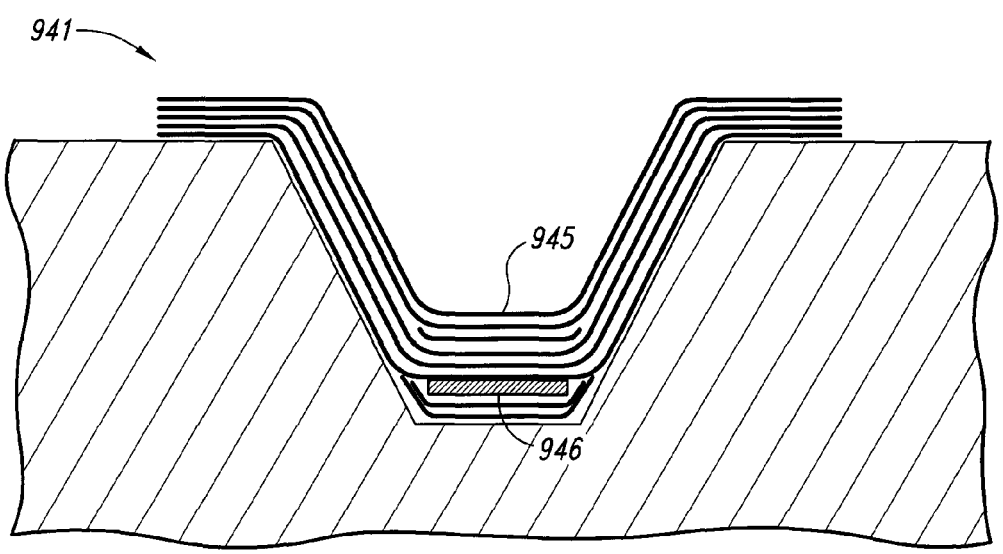
FIG. 9 is a cross-sectional end view of a structural assembly with an integrated viscoelastic damping layer in accordance with yet another embodiment of the invention.

FIG. 9 is an end view of a stiffener lay-up 941 configured in accordance with a further embodiment of the invention. The stiffener lay-up 941 is at least generally similar in structure and function to the stiffener lay-up 641 described above with reference to FIGS. 6A and 6B. In this particular embodiment, however, a damping layer 946 is attached toward an outer surface of a cap portion 945 of the stiffener lay-up 941. In all the embodiments described above including the embodiment illustrated in FIG. 9, the damping layer (e.g., the damping layer 946) can be segmented so that it does not extend over the full length of the corresponding stiffener. In this manner, the damping layer 946 could be omitted in areas where it is desirable to reduce stiffener height, for example, at those locations where the stiffener extends under or through a frame or other structure.

Although the discussion above referring to FIGS. 6A-9 has focused on hat-section stiffeners, the various manufacturing methods and damping systems described herein can be used with virtually any type of stiffener and/or other structural member, including flat panels, curved skins, and various other structural members having a wide array of different cross-sectional shapes. For example, in one embodiment, the manufacturing methods and/or damping systems described above can be used with an inverted "T" stiffener (or "blade" stiffener). In this embodiment, the stiffener can include one or more viscoelastic damping layers bonded or, otherwise adhered to the upstanding leg portion of the "T" stiffener. Similar implementations are possible with "L," "C," "Z," and "S"-shaped stiffener configurations, among others. In yet another embodiment, a torque-tube damping element having an outer constrained layer and/or an internal damping medium can be positioned inside a hat-section stiffener to provide noise reduction.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A structural assembly having an integral damping system, the structural assembly comprising:
    a stiffener, the stiffener including:
        a first stiffener portion having a flange portion configured to be bonded to a skin panel;
        a second stiffener portion spaced apart from the first stiffener portion and configured to be offset from the skin panel, wherein the second stiffener portion includes a cap portion offset from the flange portion, the second stiffener portion including at least first and second plies of fiber-reinforced resin material; and
        a layer of damping material sandwiched between the first and second plies of fiber-reinforced resin material.

2. The structural assembly of claim 1 wherein the first ply of fiber-reinforced resin material extends from the first stiffener portion to the second stiffener portion.

3. The structural assembly of claim 1 wherein the first and second stiffener portions are composed of fiber-reinforced resin material.

4. The structural assembly of claim 1 wherein the layer of damping material includes a viscoelastic damping material.

5. The structural assembly of claim 1 wherein the layer of damping material includes a viscoelastic adhesive.

6. The structural assembly of claim 1, further comprising the skin panel, wherein the skin panel is composed of fiber-reinforced resin material and the first stiffener portion is attached to the skin panel.

7. The structural assembly of claim 1, further comprising the skin panel, wherein the skin panel is composed of a first portion of fiber-reinforced resin material, wherein the first and second stiffener portions are composed of a second portion of fiber-reinforced resin material, and wherein the first stiffener portion is bonded to the skin panel.

8. The structural assembly of claim 1, further comprising the skin panel, wherein the skin panel is a portion of aircraft fuselage skin composed of fiber-reinforced resin material, and wherein the first stiffener portion is bonded to the portion of aircraft fuselage skin.

9. The structural assembly of claim 1, further comprising the skin panel, wherein the skin panel is composed of a first portion of fiber-reinforced resin material, wherein the first and second stiffener portions are composed of a second portion of fiber-reinforced resin material, wherein the flange portion is bonded to the skin panel, and wherein the layer of damping material includes a viscoelastic damping material.

10. A structural assembly having an integral damping system, the structural assembly comprising:
   a skin, the skin including at least a first ply of fiber-reinforced resin material; and
   means for stiffening the skin, the means for stiffening the skin including:
      a second ply of fiber-reinforced resin material;
      at least a third ply of fiber-reinforced resin material; and
      means for damping vibration, wherein the means for damping vibration are sandwiched between the second and third plies of fiber-reinforced resin material, wherein the means for stiffening the skin are bonded to the skin by cocurring the first, second, and third plies of fiber-reinforced resin material.

11. The structural assembly of claim 10 wherein the means for stiffening the skin include a first portion attached to the skin and a second portion offset from the skin.

12. The structural assembly of claim 10 wherein the skin includes an aircraft fuselage skin.

13. A structural assembly having an integral damping system, the structural assembly comprising:
   an aircraft fuselage skin, the aircraft fuselage skin including at least a first ply of fiber-reinforced resin material; and
   means for stiffening the aircraft fuselage skin, wherein the means for stiffening the aircraft fuselage skin include a stiffener having a flange portion attached to the skin and a cap portion offset from the skin, the stiffener including:
      a second ply of fiber-reinforced resin material;
      at least a third ply of fiber-reinforced resin material; and
      means for damping vibration, wherein the means for damping vibration are sandwiched between the second and third plies of fiber-reinforced resin material.

14. The structural assembly of claim 13 wherein the means for damping vibration are viscoelastic.

15. The structural assembly of claim 13 wherein the means for damping vibration are positioned toward the cap portion of the stiffener.

* * * * *